(No Model.)

E. P. GAINES & W. P. ORR.
HUB.

No. 407,342.  Patented July 23, 1889.

Witnesses
Henry G. Dieterich
R. W. Bishop.

Inventors
Edward P. Gaines and
Walter P. Orr
By their Attorneys

UNITED STATES PATENT OFFICE.

EDWARD P. GAINES AND WALKER P. ORR, OF BRADSHAW, TENNESSEE; SAID GAINES ASSIGNOR TO SAID ORR AND WILLIAM P. HARWELL, OF SAME PLACE.

HUB.

SPECIFICATION forming part of Letters Patent No. 407,342, dated July 23, 1889.

Application filed April 20, 1889. Serial No. 307,963. (No model.)

*To all whom it may concern:*

Be it known that we, EDWARD P. GAINES and WALKER P. ORR, citizens of the United States, residing at Bradshaw, in the county of Giles and State of Tennessee, have invented a new and useful Vehicle-Hub, of which the following is a specification.

Our invention relates to improvements in vehicle-hubs; and it consists in certain novel features, hereinafter described and claimed.

Figure 1:
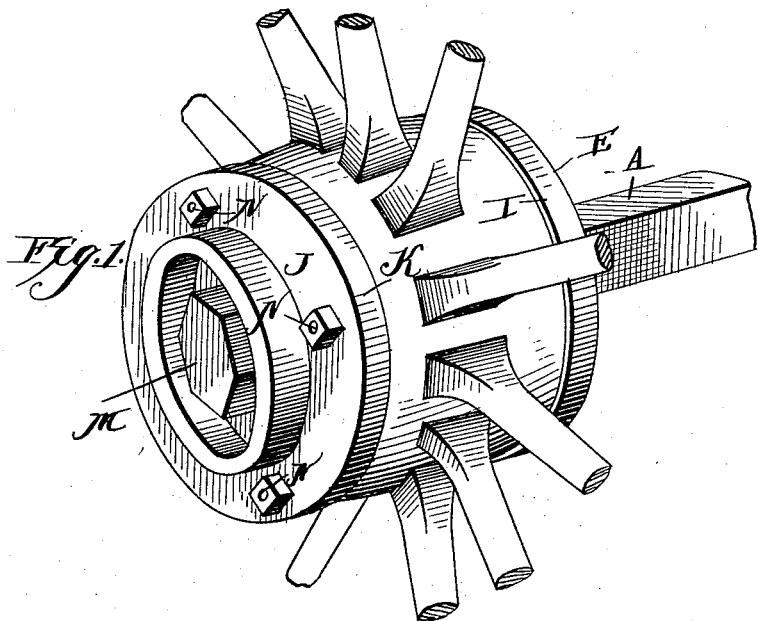
Figure 2:
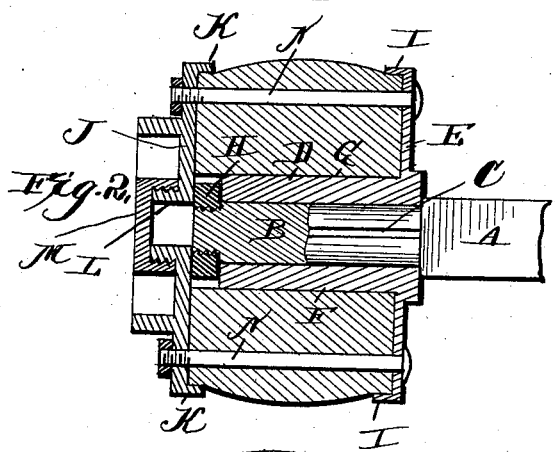
Figure 3:
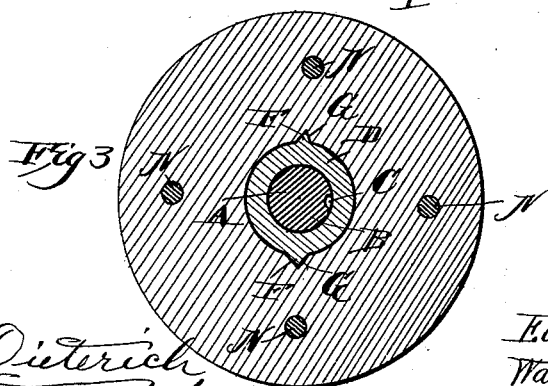

In the accompanying drawings, Figure 1 is a perspective view of a hub embodying our invention. Fig. 2 is a vertical section of the same, and Fig. 3 is a sectional view taken at right angles to Fig. 2.

In carrying out our invention we employ an axle A, which may be of any desired construction, and is provided at its ends with a spindle B, and the said spindle is provided with a longitudinal groove C for the reception of lubricating material. The spindle is made just long enough to pass through the hub, so as to overcome the liability to bend. On the spindle we arrange a sleeve D, having a disk E at one end, and provided on its outer side with the diametrically-opposite longitudinal ribs F, which engage longitudinal grooves G in the bore of the hub, so as to prevent the said sleeve turning in the hub, and a nut H is mounted on the end of the spindle to secure the same within the said sleeve and hub. The disk E is provided at its edge with an annular flange or band I, which projects over the hub, so as to prevent splitting of the same.

At the outer end of the hub we provide a plate or disk J similar to the disk E, and having an annular rib or flange K, which projects over the hub, so as to act with the flange I and prevent the splitting of the hub. This plate J is provided at its center with a small tube L, through which lubricating material is passed to the spindle, and the said tube is normally closed by a cap M to prevent the escape of the lubricating material. The disk or plate E, the hub, and the plate J are secured together by the long bolts N, passed through the hub, as clearly shown.

From the foregoing description it will be seen that we have provided a very simply-constructed and compactly-arranged hub which is very strong and durable. By making the spindle rather short the bending of the spindle is prevented, and by providing the longitudinal grooves in the spindle we are enabled to lubricate the device very thoroughly and easily.

The advantages of our improved hub are thought to be obvious from the foregoing description, and detailed reference thereto is deemed unnecessary.

Having thus described our invention, what we claim, and desire to secure by Letters Patent, is—

1. The combination of the spindle having a longitudinal groove, the sleeve mounted on the spindle and fitting in the bore of the hub, the plate J on the end of the hub, having a tube L, and the cap M fitting on said tube, as set forth.

2. The combination of the spindle, the sleeve mounted thereon, the nut on the end of the spindle turning up against the end of the sleeve, the hub fitting on the sleeve, the plates E J at the ends of the hub, the plate J having a central tube L, the cap on said tube, and the long bolts passing through the said plates E J and the hub, as set forth.

In testimony that we claim the foregoing as our own we have hereto affixed our signatures in presence of two witnesses.

EDWARD P. GAINES.
WALKER P. ORR.

Witnesses:
L. D. HARWELL,
A. J. LANCASTER.